March 8, 1949.  P. PORTON  2,463,905
AUTOMATIC CONTROL SYSTEM FOR AIRPLANES
Filed March 15, 1946  5 Sheets-Sheet 1

Inventor
PAUL PORTON
By Ralph B. Stewart
Attorney

March 8, 1949. P. PORTON 2,463,905
AUTOMATIC CONTROL SYSTEM FOR AIRPLANES
Filed March 15, 1946 5 Sheets-Sheet 2

Inventor
PAUL PORTON
By Ralph B. Stewart
Attorney

March 8, 1949.  P. PORTON  2,463,905
AUTOMATIC CONTROL SYSTEM FOR AIRPLANES
Filed March 15, 1946  5 Sheets-Sheet 5

INVENTOR.
PAUL PORTON
BY Ralph B. Stewart
ATTORNEY

Patented Mar. 8, 1949

2,463,905

UNITED STATES PATENT OFFICE 2,463,905

AUTOMATIC CONTROL SYSTEM FOR AIRPLANES

Paul Porton, Washington, D. C.

Application March 15, 1946, Serial No. 654,598

15 Claims. (Cl. 244—77)

1

This invention relates to a system for the automatic control of an airplane during flight.

A broad object of the invention is to devise a system for the automatic control of an airplane to maintain the plane level during flight, or automatically to maintain any predetermined or set condition of "bank," "dive" or "climb."

Another object is to devise a novel system for the automatic control of an airplane to maintain any selected condition of "bank," or a selected condition of "dive or climb," and to provide for the adjustment of the sensitivity of the system in responding to any deviation from a desired attitude of flight. This adjustment varies the extent of the "dead zone" or the angle through which the plane may roll or pitch before the control system becomes effective to correct for the deviation.

The foregoing object is attained by providing separate adjustments of the points of operation of the system in responding to "left" and "right" bank deviations. Also, separate adjustments are provided for the points at which the system responds to "climb" and "dive" deviations.

For changing the "altitude" of flight, while maintaining the same sensitivity of the system, provision is made to interlock the two elevator controls for simultaneous operation while maintaining the same relative settings.

The separate adjustments described above are provided by means of separate gravity-operated switches of simple construction, such as mercury switches, which are mounted to provide for adjustment of the axis of the switch to different angles with respect to the horizontal plane. Two switches are arranged in back-to-back relation for control of the ailerons. One switch responds to left bank deviation and the other switch responds to right bank deviation, and the two switches may be set to allow any desired amount of deviation before responding to correct for the deviation. Also, two separate switches are arranged in back-to-back relation to control the elevators and can be set to permit any desired amount of pitching of the plane before responding to correct for the deviation.

A further object is to devise a control system for an airplane in which the ailerons and the rudder are power operated and in which the controls for the ailerons and rudder may be interlocked at will for joint control in making a coordinated turn of the airplane. With this type of control, the amount of "bank" is proportional to the amount of "turn" or the extent of operation of the rudder.

2

My control system also provides for the interlocking and simultaneous operation of all five controls (two aileron, two elevator and one rudder control) for a coordinated turn which also involves a change in altitude.

Still another object is to devise a novel remote control system for a power operated rudder.

My invention also involves a dual control arrangement in which the ailerons, rudder and elevators may be operated either manually or by separate electric motors, and a clutching system is provided in which the three motors may be separately clutched or de-clutched or all three may be clutched and de-clutched simultaneously.

The preferred form of my invention is illustrated in the accompanying drawing in which.

Figure 1:
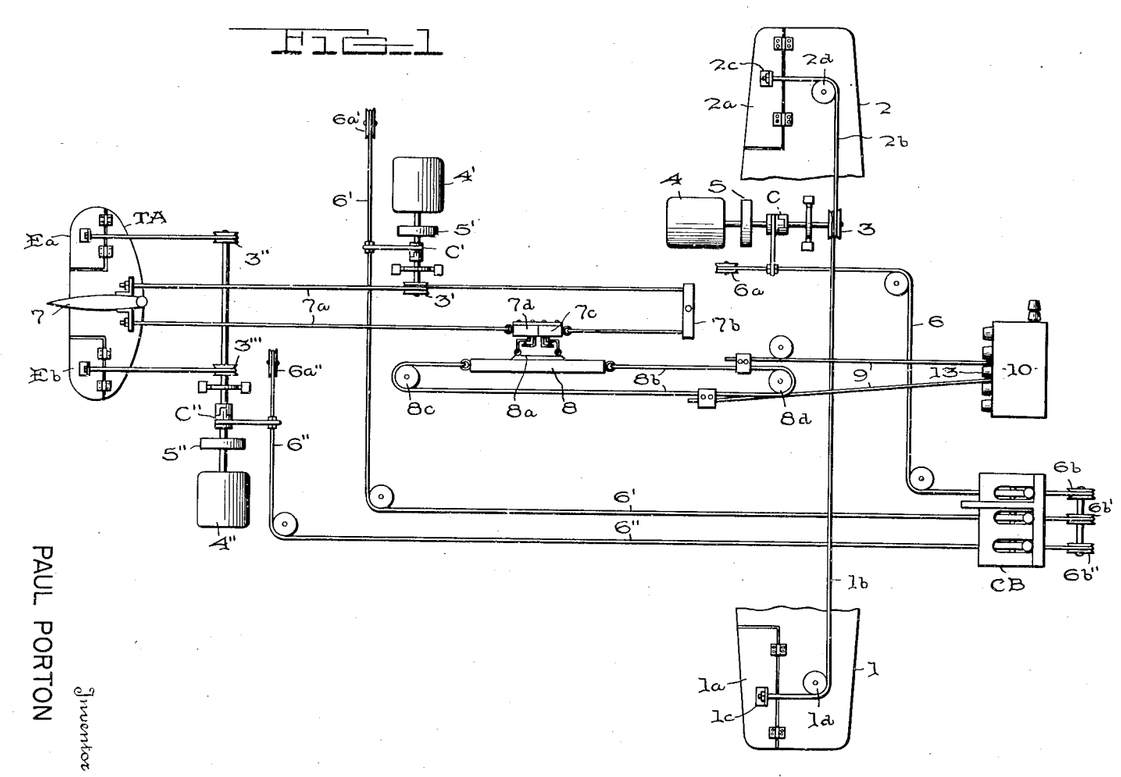
Figure 1 is a schematic plan view of the automatic control system illustrating the relation of the various cooperating components.

Referring to Figure 1 of the drawing, the general arrangement of the control system is shown diagrammatically as applied to an airplane having a right wing 1, a left wing 2 and a tail assembly TA. The aileron 1a of the right wing 1 is controlled by means of a cable 1b having one end attached to a bracket 1c on the upper side of the aileron and passing over a pulley 3 and the other end being attached to a similar bracket mounted on the lower face of the aileron. In a similar manner, aileron 2a of wing 2 is controlled by a cable 2b which also passes over the pulley 3. Suitable idler pulleys 1d and 2d are provided for guiding the cables 1b and 2b. Suitable manual controls are provided for operating cables 1b and 2b, but for the purpose of automatic control, these cables are operated by means of motor 4 which drives pulley 3 through a speed reducing gear 5, and a clutch C, interposed between the gear 5 and the pulley 3. The operation of the clutch C is controlled by a cable 6 which passes over idler pulley 6a near the motor 4 and extends over suitable idler pulleys and passes through the clutch control box CB and runs on an idler pulley 6b. Details of the clutch C and of the clutch control box CB will be described later.

The rudder 7 of the airplane is controlled by a cable 7a which is attached to brackets arranged on opposite sides of the rudder and is secured to the ends of a pivoted bar 7b. One side of the cable 7a passes over the driving pulley 3' which is driven by a motor 4' through speed reducing gear 5' and a clutch C'. The clutch C' is operated by means of a continuous cable 6' passing over pulley 6a' near the motor 4' and extending through the clutch control box CB and passing around pulley 6b'. A pair of sensitive switches 7c and 7d, such as "mute" switches, are mounted to move with one side of the cable 7a, and the operating arms of these switches are positioned adjacent a cam bar 8 having a switch operating cam piece 8a. The cam bar 8 is mounted for movement parallel with the movement of switches 7c and 7d, and the mounting arrangement includes a cable 8b passing around idler pulleys 8c and 8d, the bar 8 being interposed in one section of the cable. The cam bar 8 is operated to different positions by means of an extension cable 9 secured to the cable 8b and passing into the control box 10 where it passes around a pulley driven by the knob 13 of the control box 10.

The two elevators Ea and Eb are controlled by cables passing around pulleys 3" and 3"' which are driven by motor 4" through a speed reducing gear 5" and a clutch C". This clutch is controlled by operating cable 6" passing over pulley 6a" near the motor 4" and extending through the clutch control box CB and passing around idler pulley 6b".

Referring to the control box 10 shown in Figures 2 to 5, inclusive, there are five control knobs mounted on the front of the box and two mounted on the left end. The knob 11 controls the ailerons for making a left bank, the knob 12 is for a right bank, the knob 13 controls the rudder, the knob 14 controls the elevators to effect climbing, and knob 15 controls the elevators for diving. The knob 16 serves to interlock the controls affected by knobs 14 and 15 for simultaneous operation, and the knob 17 serves to interlock the controls of knobs 11, 12 and 13 for simultaneous operation.

Figure 2:
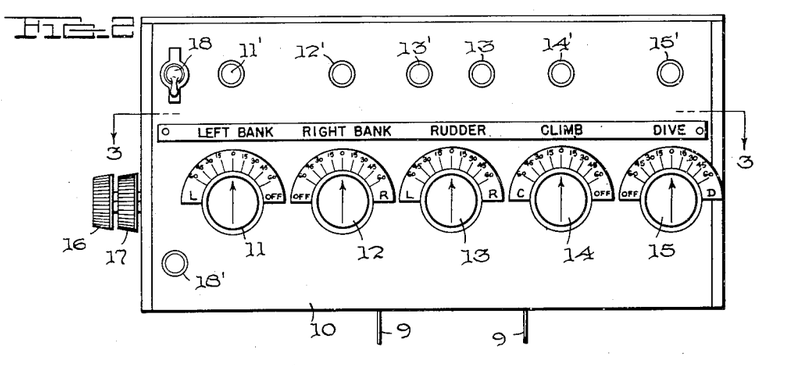
Figure 2 is a front elevation of the control box.

The control box 10 is also provided with a switch 18 for energizing the control circuit and a pilot light 18' to indicate when the circuit is energized. Similar pilot lights 11', 12', 14' and 15' are mounted on the face of the box 10 and provided to indicate operation of the controls associated with knobs 11, 12, 14 and 15, and two pilot lights 13' and 13" mounted on the face of the box are associated with the rudder operating circuits controlled by knob 13.

Figure 3:
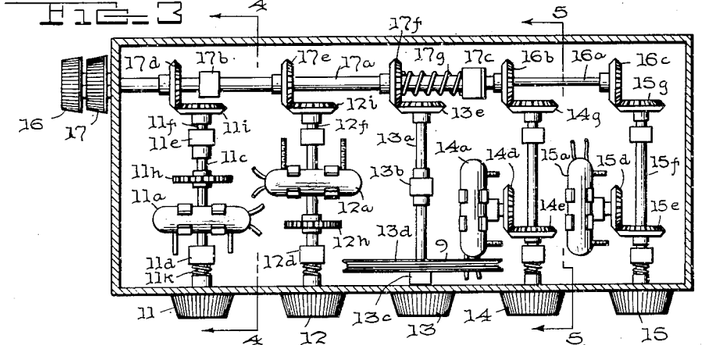
Figure 3 is a section of the control box taken along line 3—3 showing the arrangement of the mercury switches (with master control engaged).
Figure 4:
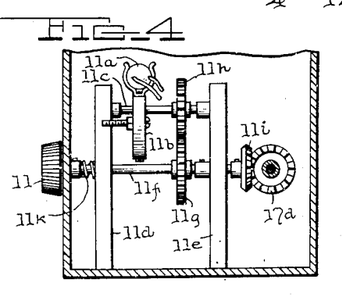
Figures 4 and 5 are sections of control box taken along lines 4—4 and 5—5 of Figure 3 and illustrating the method of mounting the aileron and elevator control switches.

Two mercury switches 11a and 12a are controlled by knobs 11 and 12, respectively, and since these switches are mounted in substantially the same manner, only one mounting will be described.

Switch 11a is supported by suitable clips upon a flat edge of a mounting disk 11b which is mounted upon a shaft 11c supported by bearing standards 11d and 11e. These standards also support a shaft 11f which carries the knob 11. The shaft 11c is rotated by shaft 11f by means of gear 11g carried by shaft 11f and engaging gear 11h carried by shaft 11c. These two gears preferably are of the same diameter, and by this arrangement, the switch 11a is rotated through the same angle as the knob 11 but in the opposite direction. A bevel gear 11i is mounted at the rear end of shaft 11f and is arranged to be engaged by a bevel gear 17d carried by tubular shaft 17a of knob 17. A spring 11k is mounted on shaft 11f and forms a brake element on the shaft 11 to maintain the shaft and the switch 11a in any position of adjustment.

It will be noted that switches 11a and 12a are mounted in back to back relation and are arranged to tilt about axes parallel with the fore and aft axis of the plane. In other words, these switches are arranged to respond to tilting of the plane about the fore and aft axis.

Switch 12a is mounted in a similar manner to switch 11, and the driving shaft 12f of knob 12 is provided at its rear end with a bevel gear 12i which engages a bevel gear 17e carried by tubular shaft 17a.

Knob 13 is mounted upon a shaft 13a journaled in standards 13b and 13c, and this shaft carries a pulley 13d over which passes the cable 9 for controlling the rudder. The rear end of shaft 13a is also provided with a bevel gear 13e positioned to be engaged by bevel gear 17f carried by tubular shaft 17a.

Figure 5:
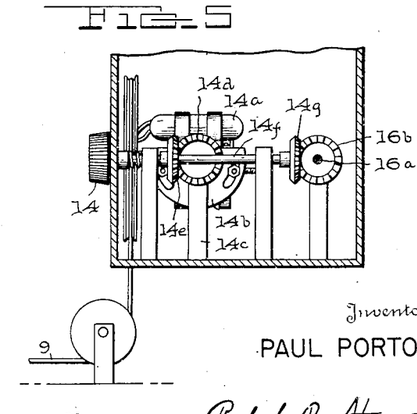

The mercury switches 14a and 15a for controlling the elevators Ea and Eb are arranged parallel to each other and at right angles to switches 11a and 12a so that they respond to pitching of the plane. The manner of mounting these switches is illustrated in Figures 3 and 5. As shown in Figure 5, switch 14a is mounted upon a mounting disk 14b which is carried on a stub shaft journaled in a bearing standard 14c. A bevel gear 14d is carried on the other end of the stub shaft and engages a bevel gear 14e carried on the shaft 14f which is turned by knob 14. Shaft 14f carries at its rear end a bevel gear 14g positioned to be engaged by a bevel gear 16b carried by shaft 16a.

Switch 15a is mounted in the same manner as switch 14a and is tilted by the knob 15 which is mounted on shaft 15f. A bevel gear 15g is also carried at the rear end of shaft 15f and positioned to be engaged by gear 16c carried by the shaft 16a. The shafts of knobs 14 and 15 are both provided with friction springs like spring 11k of knob 11 to hold the knobs in adjusted position.

From the foregoing it will be understood that tubular shaft 17a is journaled in bearing standards 17b and 17c and carries bevel gears 17d, 17e and 17f which interlock the shafts of knobs 11, 12 and 13 for simultaneous operation by the knob 17 which is secured to the shaft 17a. A spring 17g surrounding shaft 17a normally urges this shaft in a direction to disengage gears 17d, 17e and 17f from the cooperating gears 11i, 12i and 13e. Journaled within tubular shaft 17a is shaft 16a which carries bevel gears 16b and 16c for interlocking the shafts of knobs 14 and 15 for simultaneous operation. Control knob 16 is carried by the left end of shaft 16a, and this shaft also is normally urged by spring 17g into a position where gears 16b and 16c are normally disengaged from gears 14g and 15g.

The reversible power units for operating the ailerons, the rudder, and the elevators are all alike and only one unit will be described. Referring to Figures 7 to 11, the driving unit includes a reversible electric motor 4 mounted upon a base 4a which also carries the other elements of the unit including a speed reducing gear 5 driven by the motor 4 and having an output shaft 5a. An extension shaft 5b is mounted in alignment with shaft 5a and is releasably coupled to shaft 5a by means of clutch C. Pulley 3 which drives the operating cables for controlling the flight control members is mounted upon shaft 5b and is driven with this shaft by means of a friction clutch including the compression spring 3a which forces the pulley 3 against a shoulder on the shaft 5b.

Figure 8:
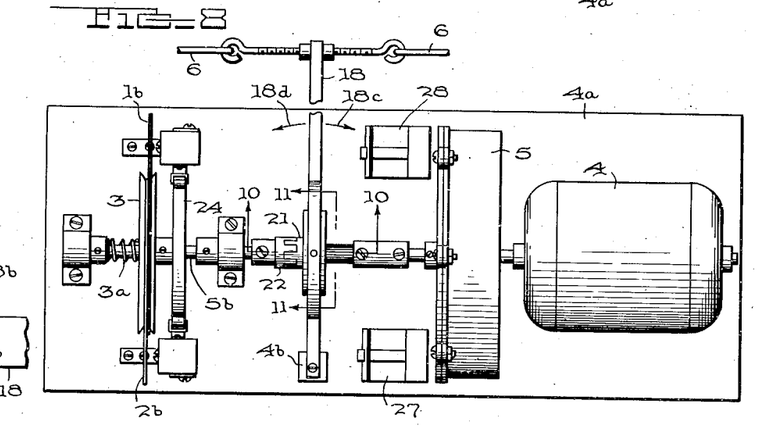
Figure 8 is a plan view of Figure 7.
Figure 10:
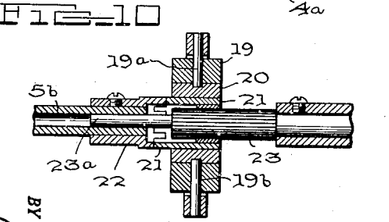
Figure 10 is a section of the clutch in Figures 7 and 8 for disengaging the motor drive.
Figure 11:
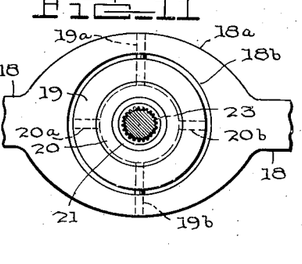
Figure 11 is a section of Figure 8 taken along line 11—11 showing the clutch operating arm.

The details of the clutch C are illustrated in Figures 8, 10 and 11 where it will be seen that the clutch involves an operating lever 18 having one end thereof pivotally supported on a standard 4b and the other end attached to the cable 6. An intermediate portion of the lever is enlarged at 18a as shown in Figure 11 and is provided with a circular opening 18b in which a ring 19 is pivotally supported about a vertical axis by means of pins 19a and 19b. A second ring 20 is journaled within ring 19 and the inner ends of pins 19a and 19b extend into a circular groove formed in the outer periphery of ring 20. A second pair of pins 20a and 20b are mounted in ring 19 at right angles to pins 19a and 19b and the inner ends of these pins also enter the groove in ring 20. Ring 20 carries a sleeve 21 which is slotted at its left end to engage with a similarly slotted sleeve 22 carried by the shaft 5b. Ring 20 and clutch sleeve 21 are driven by means of shaft 23 driven by the shaft 5a and having a splined connection with the sleeve 21. Shaft 23 has a reduced extension 23a which extends into the hollow end of shaft 5b and maintains alignment between these two shafts. As shown in Figure 8, by moving the lever 18 in the direction of the arrow 18c the clutch sleeves 21 and 22 will be disengaged, and by moving the lever in the opposite direction shown by the arrow 18d the clutch will be engaged.

Figure 7:
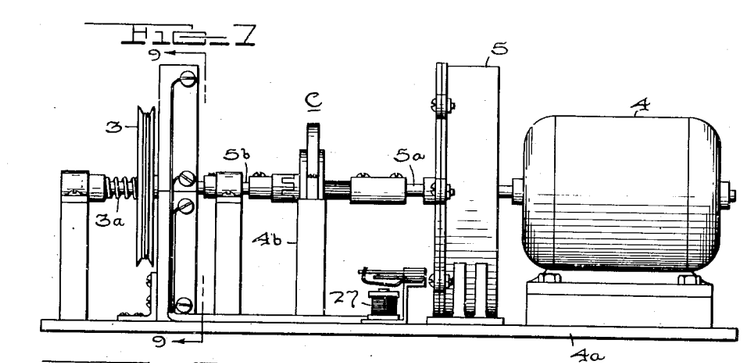
Figure 7 is a side elevation of aileron and/or elevator drives and associated parts (both are identical).
Figure 9:
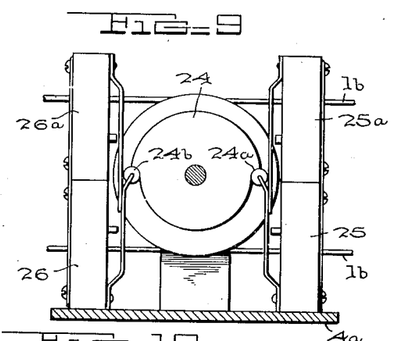
Figure 9 is a section of Figure 7 taken along line 9—9 to illustrate the micro-switch cam.
Figure 12:
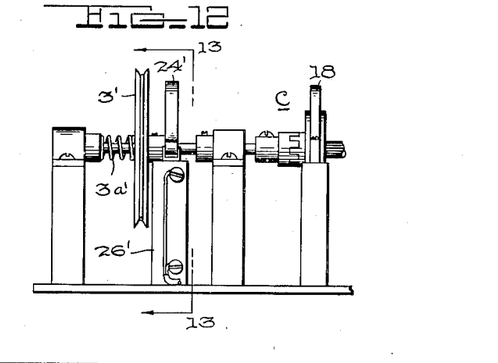
Figure 12 is a partial side elevation of the rudder drive to show difference from aileron and elevator drives.
Figure 13:
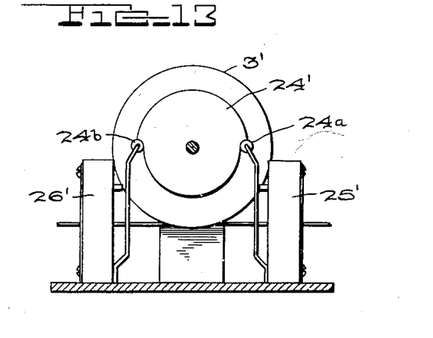
Figure 13 is a section of Figure 12 along line 13—13 showing micro switches and cam for rudder drive.

The shaft 5b also carries a switch operating cam 24 for operating switches to control the motor 4. In the arrangement for controlling the aileron and elevator operating motors two switches are provided on each side of the operating cam, but in the case of the rudder motor only one switch is provided. As shown in Figure 9, two switches 25 and 25a are arranged on one side of the cam 24 and operated by cam follower 24a while switches 26 and 26a are arranged on the other side of the cam and are operated by cam follower 24b. While two separate switches are shown on each side of the cam in Figure 9, it will be understood that the contacts embodied in the switches on the same side of the cam may be incorporated in a single switch unit, and in this case the arrangement will correspond to that shown in Figures 12 and 13 which shows only two switches for controlling the operation of the rudder motor. A pair of control relays 27 and 28 are also mounted on the base 4a of the power unit as shown in Figures 7 and 8. A similar set of relays 27'' and 28'' are provided on the unit for controlling the elevator operating motor 4''.

Figures 14, 15, 16, 17, 18:
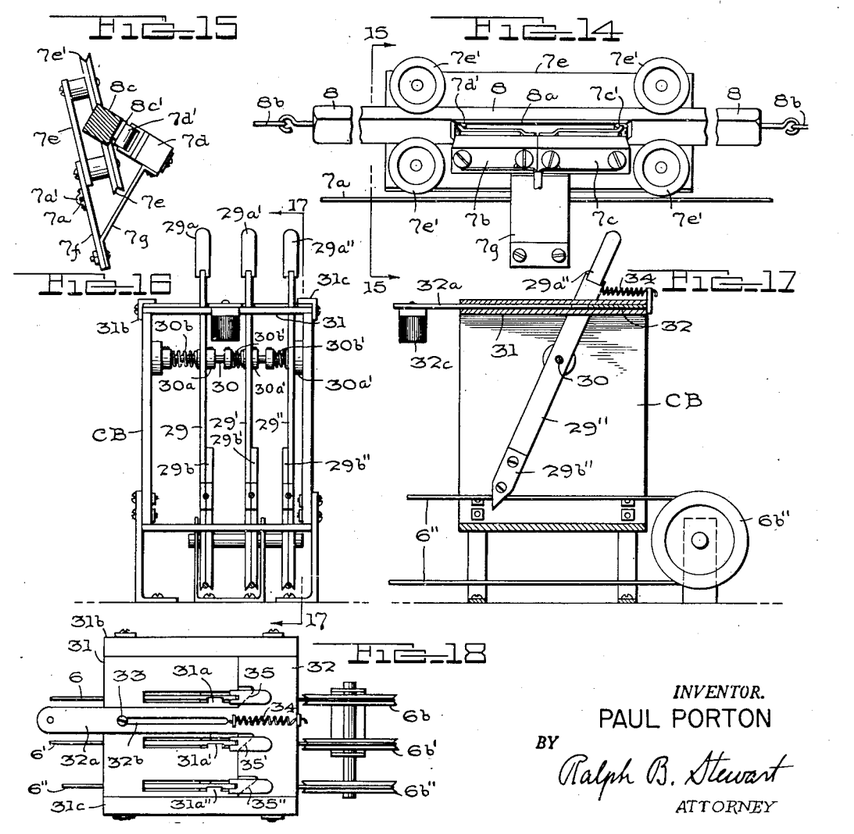
Figure 14 is a side elevation of the cam bar for controlling the micro switches in the rudder drive.
Figure 15 is a section of Figure 14 along line 15—15.
Figure 16 is a front elevation of a clutch control box showing three operating levers.
Figure 17 is a sectional view of Figure 16 along line 17—17.
Figure 18 is a plan view of the clutch control box shown in Figures 16 and 17.

The arrangement for controlling the switches 7c and 7d which control the operation of the rudder power motor 4' is illustrated in detail in Figures 14 and 15. As shown, the cam bar 8 is interposed in the control cable 8b and carries a cam strip 8a. The switches 7c and 7d are mounted upon a movable carriage which runs on the bar 8. This carriage is formed of a plate 7e having four grooved wheels 7e' mounted at the four corners thereof and arranged to engage diagonally opposite corners of the bar 8 as shown in Figures 14 and 15. A bracket plate 7f is secured to the carriage plate 7e, and a second bracket plate 7g is secured to bracket 7f and supports the switches 7c and 7d as shown in Figures 14 and 15. The operating rollers which cooperate with the cam strip 8a and serve to actuate the switches are shown at 7c' and 7d'. The rudder cable 7a is secured to the switch carriage by means of a clamp 7a' shown in Figure 15. With the cam bar and the switch carriage in the relative positions shown in Figures 1, 6 and 14, the two switches 7c and 7d are held open by means of the cam strip 8a, but movement of the cam strip in either direction will cause one of the switches to close.

Figure 6:
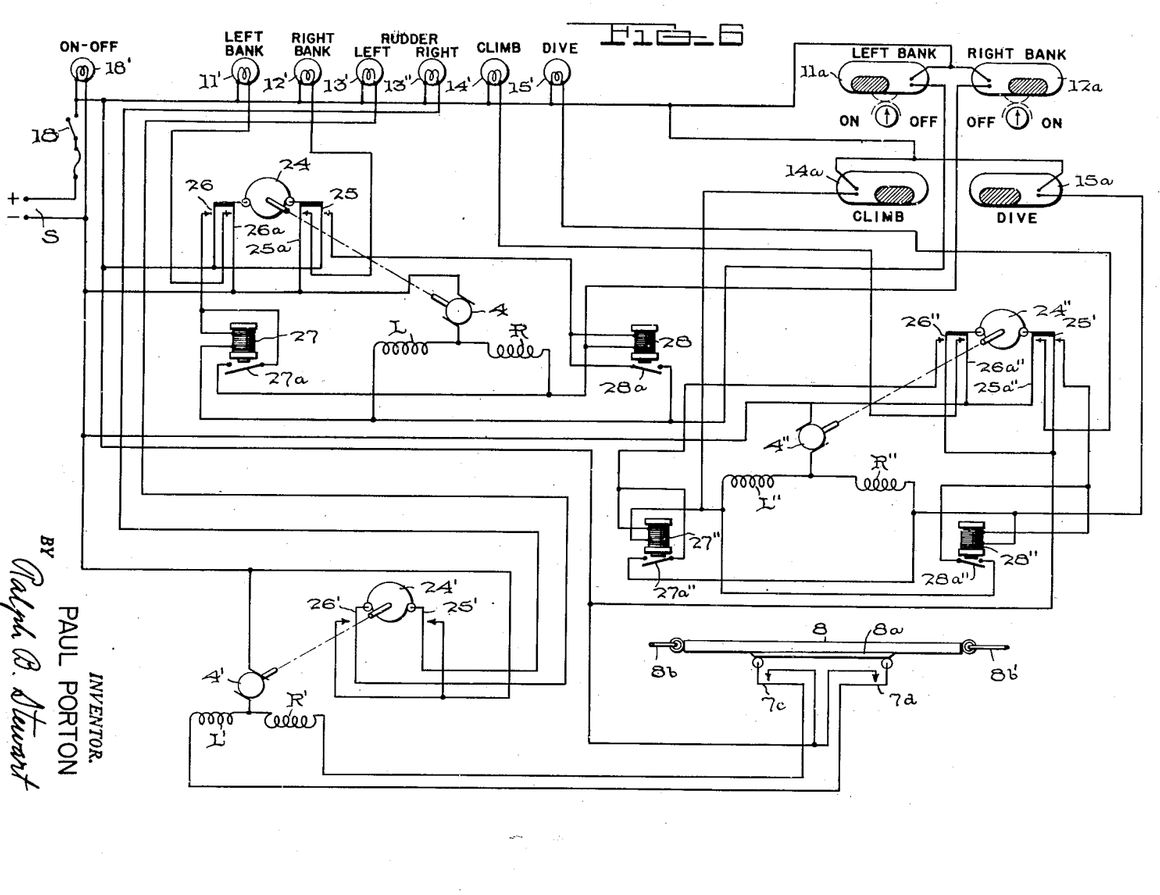
Figure 6 is a circuit diagram of the system.

The complete circuit diagram for my control system is shown in Figure 6 where current from a suitable supply circuit S is supplied through control switch 18. The current source may be either alternating or direct but for convenience in tracing the circuits, the supply lines are marked plus (+) and minus (—). Current for driving aileron motor 4 in a clockwise direction is supplied from the (—) line, through the motor armature, through field winding R and through the contacts of the "right bank" switch 12a back to (+) line. When the motor rotates in a clockwise direction cam 24 closes switch 25 which connects the winding of relay 28 in parallel with switch 12a, but this relay will not operate until switch 12a opens. The cam 24 also closes switch 25a which energizes the "right bank" pilot lamp 12'. A circuit for clockwise operation of motor 4 may also be completed from field winding R through the contact 27a of relay 27 when this relay is energized and through switch 26 (when closed by cam 24) back to (+) line.

In a like manner, current for driving motor 4 in a counter-clockwise direction is supplied from (—) line through the motor armature, through field winding L and through "left bank" switch 11a (when closed) and back to (+) line. When cam 24 turns to the left it closes switch 26 to connect the winding of relay 27 in parallel with switch 11a, but this relay will not operate until switch 11a opens. Cam 24 also closes switch 26a to energize the "left bank" pilot lamp 11'. A circuit for the counter-clockwise rotation of motor 4 may also be completed from field winding L through contact 28a of relay 28 when this relay is energized and through switch 25 (when closed by cam 24) back to (+) line.

It will be clear from Figure 6 that the elevator motor 4''' is controlled by the "climb" and "dive" switches 14a and 15a by means of circuits which are the same as those described above for motor 4. Corresponding elements in the two motor control circuits are represented by the same reference characters, the elevator motor circuit being distinguished from the other circuit by the use of the double prime mark on the reference characters.

The rudder motor 4' is controlled by switches 7c and 7d which are controlled by cam strip 8a on cam bar 8. Operation of the motor in a direction to produce "right" rudder is obtained by shifting bar 8 to the right to allow switch 7c to close which completes the motor circuit through field winding R' and the motor is driven in a direction to cause switch 7c to follow the cam strip 8a which opens the switch 7c when it arrives in its normal position. For "left" rudder, cam bar 8 is moved to the left and allows switch 7d to close which completes the motor circuit through field winding L, and the motor operates to drive the rudder and switch 7d in the opposite direction until the switch 7d is opened by cam strip 8a. When the rudder drive moves in either direction from its normal or center position, cam 24' operates switch 25' or 26' to energize the "right" or "left" rudder pilot lamps 13'' or 13' respectively.

It will be obvious that switches 7c and 7d may be of the normally open type, and the cam strip 8a would have a length such that it would normally be positioned between the two switch operating rollers so that movement of the strip in either direction would serve to close one or the other switch.

The arrangement for operating the clutches C, C' and C'' is shown in detail in Figures 16, 17 and 18. The clutch operating cables 6, 6' and 6'' pass through the clutch control box CB and pass around idler pulleys 6b, 6b' and 6b'' as shown in the drawing. Three levers 29, 29' and 29'' are pivotally supported upon a shaft 30 mounted transversely of the control box CB. The upper ends of these levers extend through slots formed in the upper wall 31 of the box CB and are provided with operating handles 29a, 29a' and 29a''. The lower ends of these levers are attached to the clutch operating cables 6, 6' and 6'' by means of clamping pieces 29b, 29b' and 29b''. The shaft 30 is provided with three fixed collars 30a, 30a' and 30a'' against which levers 29, 29' and 29'' are urged by means of springs 30b, 30b' and 30b''. These springs serve to hold the levers 29, 29' and 29'' behind latching extensions 31a, 31a' and 31a'' formed on top plate 31 and extending into the slots in which the levers are located. It will be understood that the levers are shown in their latched positions in Figures 17 and 18, and in these positions the clutches are engaged.

Each clutch may be disengaged by moving the corresponding operating lever from behind the latching extension and moving the lever forward to the other end of the slot. It may be desirable to de-clutch all of the power elements simultaneously, and for this purpose a single de-clutching element is provided and involves a transverse plate 32 arranged on top of plate 31 and positioned to the rear of the levers 29, 29' and 29''. A pair of angle pieces 31b and 31c are secured on each side of the control box CB at the top thereof and the horizontal flanges of these angle pieces are spaced from the top plate 31 to provide parallel slots in which the ends of the plate 32 are positioned and guided. The plate 32 is provided with a forwardly extending tongue 32a which has a guide slot 32b receiving a guiding screw 33 secured to plate 31. An operating handle or knob 32c is secured to the tongue 32a at the outer end thereof. The de-clutching plate 32 is normally held in its rear position by means of a suitable spring 34. The plate 32 is provided on its front edge with three notches 35, 35' and 35'' having inclined edges positioned in line with the levers 29, 29' and 29''. When it is desired to de-clutch all of the power elements simultaneously, the de-clutching plate 32 is pulled forward by means of the operating knob 32c, and the inclined edges of the notches 35, 35' and 35'' will shift the levers 29, 29' and 29'' laterally from behind the latching extensions 31a, 31a' and 31a'', and continued movement of the plate 32 will move the levers to their forward or de-clutched positions.

Operation of my control system is as follows. It will be understood that during take-off, and until the plane reaches the desired elevation and course, the various power units are de-clutched and the pilot operates the manual controls to set the aircraft on course. The pilot then adjusts the banking knobs 11 and 12 to secure the desired sensitivity of the system in responding to tilting of the plane about the banking axis. In rough weather it is desirable to set these controls for low sensitivity, that is, it is desirable to set the controls to allow for a fair amount of tilting before the gravity switches operate to correct for the tilting. It will be understood that with the plane flying level, the control knobs 11 and 12 will be set so that the switches 11a and 12a are normally open, and the amount of sensitivity is controlled by adjustment of these knobs. If high sensitivity is desired, the knobs are rotated towards the "on" position and are stopped at a point where only a slight tilting of the plane will cause the switch to turn on. If low sensitivity is desired, the knobs are moved to a position further removed from the "on" position and closer to the "off" position. The climb and dive controls 14 and 15 are also set in a similar manner. After this, the power units may be connected to their respective flight control members for automatic operation of these members as controlled by the gravity operated switches.

Referring to Figure 6, if the plane should tilt to the left about the banking axis, the right bank switch 12a would close its contacts to energize the aileron motor 4 through field winding R and the motor will operate in a direction to execute a "right bank" and thus correct for the tilting. As soon as the correction has been applied, the switch 12a will open its contact, and thereby remove the shunt-circuit from around the winding of relay 28 which will then close a circuit for motor 4 through field winding L and through the switch 25. Motor 4 will now operate in the opposite direction to return the ailerons to their normal position. In case the plane tilts to the right, the same operation takes place except that the left bank switch 11a becomes effective to introduce a counterbalancing "left bank" movement and the relay 27 serves to return the ailerons to their normal position after the correction has been made.

In case the plane should nose downwardly, the contacts of switch 14a will be closed and will energize the motor 4'' through the field winding L'' to introduce a "climb" correction. As soon as the plane reaches its normal condition of flight, the contacts of switch 14a open and remove the shunt-circuit from around relay 27'' which then completes the circuit for motor 4'' through field winding R'', and the motor then operates to return the elevators to their normal position. In case the tail of the plane becomes depressed below its normal flight condition, switch 15a becomes operative to introduce a "dive" correction and after the plane returns to its normal position relay 28" controls the motor to return the elevators to their normal position.

It will be understood that the rudder is controlled by the knob 13, and there is no sensitivity adjustment for this control. One advantage of the arrangement disclosed is that in case the rudder is blown from its normal position by sudden gusts, the motor control system will automatically return the rudder to its normal or set position.

When the pilot wishes to make a turn with coordinated banking, this is done by the control knob 17. By pushing this knob inwardly, the two banking controls 11 and 12 are interlocked with the rudder control 13 for simultaneous operation. If a left turn is to be made, knob 17 is turned to produce counter-clockwise rotation of the knobs 11, 12 and 13 and if a right turn is to be made the knob 17 is turned in the opposite direction. By this arrangement, a turn with coordinated banking may be executed without disturbing the sensitivity setting.

If the pilot wishes to trim the plane by a slight left bank, he turns the knob 11 to the left to secure the necessary trimming and then returns the knob to its original setting. In a like manner, if he wishes to trim the plane with a slight right bank, the knob 12 is turned to the right and then returned to its original setting. The climb and dive controls 14 and 15 may also be moved independently to secure trimming of the plane with regard to the amount of climb or dive.

When the pilot wishes to change the elevation at which the plane is flying, this may be done without disturbing the sensitivity setting of the controls 14 and 15 by pressing inwardly on the knob 16 and turning it in the desired direction to effect either climb or dive. After the plane reaches the desired elevation, the knob 16 is released and allowed to return to its normal position.

It will be noted that the knobs 16 and 17 are positioned sufficiently close together so that both knobs may be operated by the same hand and at the same time to simultaneously interlock all five controls 11 to 15, inclusive, for the purpose of making a coordinated turn which also involves a change in altitude.

In the power unit for driving the various flight control members of the plane, the friction clutch arrangement formed in part by the spring 3a provides a safety feature to prevent damage to the controlling parts if they become blocked. This clutch permits the motor to run without turning the operating pulley 3 which drives the controlling cables. This friction clutch also permits movement of the rudder under excessive forces without breaking the driving connection to the motor, and the motor remains effective to return the rudder to its set position in case the rudder is accidentally displaced.

While I have illustrated a specific form of clutch C for de-clutching the various power motors from the flight control operating systems, it will be understood that other clutch constructions may be used if desired. In the broader aspect of my invention it is also possible to use other forms of power units for reversibly driving the flight control members of the aircraft.

The switches 25 and 26 associated with aileron motor 4, and the switches 25" and 26" associated with the elevator motor 4", constitute "centering" switches for effecting the return of the ailerons and the elevator to the nomal or center position after each operation of the motors to correct for a deviation. The centering operation of the motors has already been explained, but it will be noted that it requires the joint action of one of the centering switches and one of the centering relays 27 and 28 or 27" and 28". It will also be noted that the centering operation does not take place until the opening of the gravity-operated switch which caused the original movement of the flight control member from its normal or center position.

I claim:

1. In a control system for aircraft having a movable flight controlling member, the combination of reversible power means for operating said member in opposite directions, a pair of gravity-operated switches mounted to respond oppositely to tilting of said aircraft in a predetermined tilting plane and being connected to effect operation of said power means in opposite directions, means mounting said switches for independent tilting adjustment in said tilting plane, and separate manual control elements for independently tilting said switches to different angular positions.

2. A control system according to claim 1 and including a common operating member, and means for releasably interlocking said pair of switches for simultaneous tilting in fixed relative positions by said common operating member.

3. In a control system for an airplane having ailerons and a rudder, the combination of reversible power means for operating the ailerons in opposite directions, a pair of gravity-operated switches mounted to respond oppositely to tilting of said airplane in a transverse tilting plane and being connected to effect operation of said power means in opposite directions, means mounting said switches for independent tilting adjustment in said transverse plane, separate manual control elements for independently tilting said switches to different angular positions, reversible power means for operating said rudder in opposite directions, a movable control member for controlling the direction of operation of said rudder operating means, and a common operating member for releasably interlocking said pair of switches for simultaneous tilting in fixed relative positions and for moving said movable control member to effect a coordinated turn of said airplane.

4. In a control system for an airplane having ailerons, a rudder, and an elevator, the combination of reversible power means for operating the ailerons in opposite directions, a pair of gravity-operated switches mounted to respond oppositely to tilting of said airplane in a transverse tilting plane and being connected to effect operation of said power means in opposite directions, means mounting said switches for independent tilting adjustment in said transverse plane, reversible power means for operating said elevator in opposite directions, separate manual control elements for independently tilting said switches to different angular positions, a second pair of gravity-operated switches mounted to respond oppositely to pitching of said airplane and being connected to effect operation of said second power means in opposite directions, means mounting said second pair of switches for independent tilting adjustment in said pitching plane, separate manual control elements for independently tilting said second pair of switches to different angular positions, reversible power means for operating said rudder in opposite directions, a movable control member for controlling the direction of operation of said rudder operating means, and common operating means for releasably interlocking said two pairs of switches for simultaneous tilting in fixed relative positions and for moving said movable control member to effect a coordinated turn of said airplane.

5. In a control system for an airplane having a pair of ailerons, the combination of reversible power means for operating the ailerons in opposite directions, a pair of gravity operated switches mounted to respond oppositely to tilting of said airplane in a transverse tilting plane and being connected to effect operation of said power means in opposite directions, means mounting said switches for independent tilting adjustment in said transverse plane, separate manual control elements for independently tilting said switches to different angular positions, a common operating member for interlocking said pair of switches for simultaneous tilting in said transverse plane while maintaining their relative positions of adjustment, and spring means normally holding said common operating member out of interlocking engagement with said switches.

6. In a control system for an airplane having an elevator, the combination of reversible power means for operating said elevator in opposite directions, a pair of gravity operated switches mounted to respond oppositely to pitching of said airplane in a vertical plane parallel with the fore-and-aft axis thereof and being connected to effect operation of said power means in opposite directions, means mounting said switches for independent tilting adjustment in said vertical plane, separate manual control elements for independently tilting said switches to different angular positions, a common operating member for interlocking said pair of switches for simultaneous tilting in said plane while maintaining their relative positions of adjustment, and spring means normally holding said common operating member out of interlocking engagement with said switches.

7. In a control system for aircraft having a movable flight control member, the combination of reversible power means for operating said member in opposite directions from a center position, a pair of gravity-operated switches mounted to respond oppositely to tilting of said aircraft in a predetermined tilting plane and being connected to effect operation of said power means in a direction to correct for said tilting, a pair of centering switches arranged to be operated by movement of said flight control member in opposite directions from its center position, a pair of circuits controlled by said centering switches selectively for energizing said reversible power means in a direction to return said flight control member to center position, and means responsive to the opening of one of said gravity operated switches for energizing one of said centering circuits.

8. In a control system for aircraft having a movable flight control member, the combination of reversible power means for operating said member in opposite directions from a center position, a pair of gravity-operated switches mounted to respond oppositely to tilting of said aircraft in a predetermined tilting plane and being connected to effect operation of said power means in a direction to correct for said tilting, a pair of centering switches arranged to be operated by movement of said flight control member in opposite directions from its center position, a pair of relays having operating windings connected by said centering switches in separate paths shunting said gravity operated switches, and circuits controlled by said relays when operated for energizing said reversible power means to return said flight control member to center position.

9. In a control system for aircraft having a rudder, the combination of reversible power means for operating said rudder in opposite directions, a pair of electric switches for controlling the operation of said power means, means for mounting said switches for movement along a predetermined path and in accordance with the movement of said rudder, and a control element mounted for movement adjacent the path of movement of said switches and serving to operate said switches when moved in opposite directions.

10. In a control system for aircraft having a rudder, the combination of reversible power means for operating said rudder in opposite directions including a rudder operating cable, a cam bar mounted for longitudinal movement parallel to a section of said cable, a carriage mounted for movement on said bar and being connected to said cable, a pair of switches mounted on said carriage and serving to control the operation of said power means in opposite directions, and a cam strip carried by said bar for actuating said switches when said bar is moved relative to said cable.

11. In a control system for aircraft having a rudder, the combination of reversible power means for operating said rudder in opposite directions including a rudder operating cable, a control cable having a portion thereof mounted for movement parallel with a portion of said rudder operating cable, a pair of switches for controlling the operation of said power means and being mounted for movement with one of said parallel cable portions, and switch operating means mounted for movement with the other parallel cable portion.

12. A control system according to claim 4 and including a clutch for connecting each of said power means to the respective flight control member, an operating member for each clutch, a control cable for each operating member, a common control box for said control cables including a latchable control lever for each control cable, and common means for simultaneously releasing all three of said control levers.

13. In a control system for an airplane having at least three flight control members, the combination of separate reversible power means for operating each flight control member, a clutch for connecting each of said power means to the respective flight control member, an operating member for each clutch, a control cable for each operating member, a common control box for said control cables including a latchable control lever for each control cable, and common means for simultaneously releasing all three of said control levers.

14. In a control system for aircraft having a movable flight control member, the combination of reversible power means for operating said member in opposite directions from a center position, a gravity-operated switch mounted to respond to the tilting of said aircraft in a given direction in a predetermined tilting plane and being connected to effect operation of said power means in a direction to correct for said tilting, a centering switch operated to closed position by movement of said flight control member from its center position, a circuit including said centering switch for energizing said reversible power means in a direction to return said flight control member to center position, and means controlled by said gravity-operated switch in closed position for preventing completion of said centering circuit, whereby said centering circuit becomes effective only when said gravity-operated switch is in open position.

15. In a control system for aircraft having a flight control member, the combination of reversible power means for operating said member in opposite directions including an operating cable, a control cable having a portion thereof mounted for movement parallel with a portion of said operating cable, means including a pair of switches for controlling the operation of said power means in opposite directions, said switches being mounted for movement with one of said parallel cable portions, and operating means for said pair of switches mounted for movement with the other parallel cable portion.

PAUL PORTON.

REFERENCES CITED

The following references are of record in the file of this patent:

UNITED STATES PATENTS

| Number | Name | Date |
|---|---|---|
| 1,326,945 | Macy | Jan. 6, 1920 |
| 1,418,335 | Sperry | June 6, 1922 |
| 1,794,690 | Horni | Mar. 3, 1931 |
| 1,904,801 | Plutino | Apr. 18, 1933 |
| 1,918,082 | Carlson | July 11, 1933 |
| 2,066,194 | Bates | Dec. 29, 1936 |
| 2,234,326 | Tiebel | Mar. 11, 1941 |